United States Patent [19]

Sinnamon

[11] Patent Number: 5,921,224
[45] Date of Patent: Jul. 13, 1999

[54] EXHAUST GAS RECIRCULATION VALVE CONTROL

[75] Inventor: James F. Sinnamon, Birmingham, Mich.

[73] Assignee: General Motors Corporation, Detroit, Mich.

[21] Appl. No.: 08/948,499

[22] Filed: Oct. 10, 1997

[51] Int. Cl.[6] .......................... F02M 25/07; H01H 47/00
[52] U.S. Cl. ...................... 123/568.21; 361/153
[58] Field of Search ................... 123/568.21, 568.22, 123/568.26, 568.27; 701/108; 73/117.3; 251/129.15; 361/154, 153, 152; 318/561

[56] References Cited

U.S. PATENT DOCUMENTS

| | | | |
|---|---|---|---|
| 4,171,691 | 10/1979 | Nohira et al. | 123/568.22 |
| 4,173,205 | 11/1979 | Toelle | 123/568.22 |
| 4,373,497 | 2/1983 | Hamren | 123/568.27 |
| 4,383,441 | 5/1983 | Willis et al. | 73/117.3 |
| 4,671,107 | 6/1987 | Chiesa et al. | 73/118.2 |
| 4,925,156 | 5/1990 | Stoll et al. | 361/154 |
| 5,029,570 | 7/1991 | Stoltman et al. | 123/568.21 |
| 5,094,218 | 3/1992 | Everingham et al. | 123/568.26 |
| 5,323,748 | 6/1994 | Foster et al. | 123/568.26 |
| 5,450,270 | 9/1995 | Takahashi | 361/154 |
| 5,508,926 | 4/1996 | Wade | 701/29 |
| 5,621,167 | 4/1997 | Fang-Cheng | 73/118.1 |
| 5,632,257 | 5/1997 | Machida et al. | 73/117.3 |
| 5,690,083 | 11/1997 | Gopp et al. | 123/568.21 |
| 5,831,809 | 11/1998 | Schmity et al. | 361/154 |

*Primary Examiner*—Andrew M. Dolinar
*Assistant Examiner*—Arnold Castro
*Attorney, Agent, or Firm*—Michael J. Bridges; Vincent A. Cichosz

[57] ABSTRACT

An exhaust gas recirculation valve control strategy comprised of learning and continuously updating system operating conditions that affect EGR valve control response, and controlling the EGR valve in response to the learned operating conditions for precise, robust EGR valve control. An adaptive base control signal is learned during an engine operating state where no EGR valve movement is needed, such as during engine idle. The base control signal is then continuously applied to the EGR valve, maintaining the valve at an energized level just below the beginning of valve opening. When a desired degree of opening is determined, the change in control signal is made in reference to the base control signal, reducing the magnitude of the resulting control signal change and control gains necessary to initiate valve movement, enabling faster and more stable EGR control. The base control signal is then periodically adjusted in response to fluctuations in predetermined engine parameters, such as system voltage, manifold air pressure, and EGR operating temperature.

15 Claims, 4 Drawing Sheets

EXHAUST GAS RECIRCULATION VALVE CONTROL

TECHNICAL FIELD

This invention relates to automotive engine controls and, more particularly, to control of an automotive exhaust gas recirculation valve.

BACKGROUND OF THE INVENTION

The use of an exhaust gas recirculation (EGR) system to recirculate internal combustion engine exhaust gas to an inlet air path of the engine is well known. EGR can lower the level of certain undesirable engine emission components such as nitrogen oxide (NOx) and can improve fuel economy. Up to a limit, NOx emissions decrease with increasing EGR levels. Beyond the limit, EGR can increase formation of other undesirable engine emission components and can reduce vehicle driveability.

EGR typically involves recirculation of exhaust gas through an EGR passage between an engine exhaust conduit and an engine fresh air intake passage. A valve within the EGR passage (the EGR valve) is controlled to vary a restriction within the EGR passage to regulate the flow of exhaust gas therethrough. When EGR is not required, the EGR valve is driven to a full restriction (closed) position, typically through a spring preload. The spring preload is commonly required to be substantial, to ensure rapid closing of the EGR valve when necessary, and to ensure proper sealing of a closed EGR valve. When EGR is required, the EGR valve is driven to an open position through application of a position control signal to an actuator mechanically linked to the EGR valve. The degree of opening of the EGR valve varies with the magnitude of the position control signal.

The substantial spring preload required for rapid closing and proper sealing of the EGR valve presents a significant EGR control challenge. A large initial control signal, and therefore a large control gain, is required to open the EGR valve from a fully closed position. This large initial control gain can lead to overshoot and transient oscillations within the EGR control system and instability in EGR valve response. In addition to the substantial EGR valve spring preload, constant changes in the engine environment in which the EGR valve is located can present EGR control challenges. For example, engine intake manifold air pressure variation incident on the EGR valve can vary EGR valve response to a position control signal. Temperature within the engine compartment in which the EGR valve and corresponding actuator are located may vary significantly during an engine ignition cycle. Such temperature variations can vary the operating characteristics of the actuator that drives the EGR valve, leading to variation in EGR valve response to a position control signal. System operating voltage variations, for example caused by sudden changes in electrical load, can lead to variation in EGR valve response to a position control signal. Operating voltage may vary from vehicle to vehicle, or within the same vehicle under different operating conditions.

EGR control methods have been proposed. Some of these methods control EGR in accordance with predetermined engine parameters through fixed relationships. Other methods control EGR in accordance with predetermined engine parameters through adjustable relationships, providing for compensation of the EGR control signal in response to changes in engine operating parameters, such as engine speed and load. However, these methods do not compensate for the large initial control signal, and therefore large control gain, required to initially open the valve, thus not providing precision EGR control. Nor do these control methods compensate the EGR control signal for the wide range of operating temperatures and voltages encountered by the EGR valve within the engine environment, thus not providing stable, robust control of the EGR valve.

It would therefore be desirable to reduce the initial position control signal, and therefore the initial control gain, required to initiate movement of the EGR valve from its fully closed position, reducing transient oscillations and overshoot and providing faster and more precise EGR control. It would further be desirable to compensate the initial EGR position control signal in response to variations in the EGR operating environment, for example, manifold air pressure, EGR operating temperature, and system voltage, providing more precise EGR control.

SUMMARY OF THE INVENTION

This invention overcomes the shortcomings of conventional EGR control proposals by learning and continuously updating system operating conditions that affect EGR valve control response, and controlling the EGR valve in response to the learned operating conditions for precise, robust EGR valve control.

In accordance with a first aspect of this invention, an adaptive base control signal is learned. The base control signal is established during an engine operating state where no EGR valve movement is needed, such as during engine idle. The EGR valve is commanded open to a predetermined position. The magnitude of the predetermined position is such that the resulting EGR flow is insignificant. The control signal needed to maintain the EGR valve at the predetermined position is identified and reduced by a predetermined amount, for example about ten percent, to form a base control signal. The base control signal is then continuously applied to the EGR valve, maintaining the valve at an energized level just below the beginning of valve opening. When a desired degree of opening is determined, a change in the position control signal is made in reference to the base control signal, reducing the magnitude of the resulting control signal change. The control gain necessary to initiate valve movement is thus reduced, enabling faster and more precise EGR control.

In accordance with a further aspect of this invention, the base control signal is periodically adjusted in response to fluctuations in predetermined engine parameters, such as system voltage, manifold air pressure, and EGR operating temperature. Compensation values are calculated in response to sampled engine parameters and the base control signal is adjusted accordingly. In accordance with still a further aspect of this invention, the base control signal may be updated periodically throughout an ignition cycle, allowing for periodic recalibration of the base control signal in response to engine operation.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
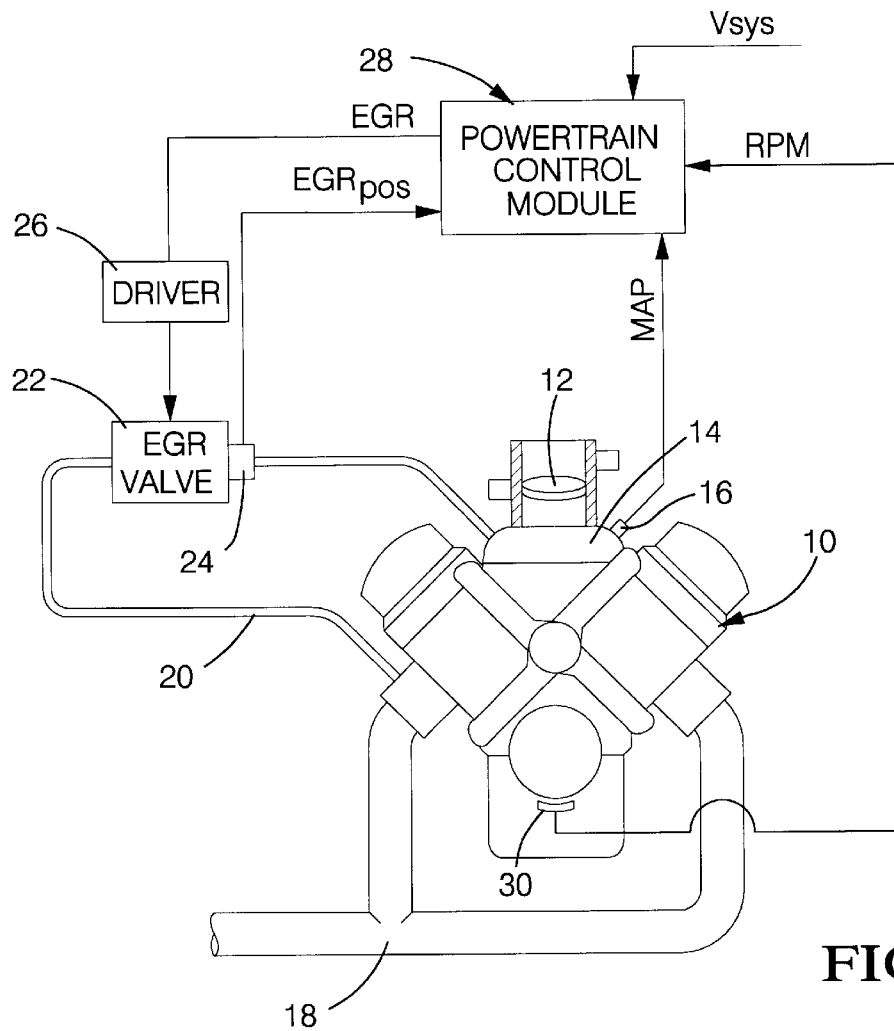
FIG. 1 is a general diagram of the engine hardware and controller in which this invention is carried out in accord with the preferred embodiment.

Referring to FIG. 1, an internal combustion engine 10 receives inlet air through inlet air valve 12, such as a conventional butterfly valve. Inlet air passes to an engine intake manifold 14. The manifold absolute air pressure is transduced in the intake manifold by a conventional pressure transducer 16 into signal MAP. Engine cylinder exhaust gas generated through operation of engine 10 passes from the engine cylinders (not shown) through exhaust conduit 18 to a conventional catalytic treatment device (not shown). A portion of the exhaust gas is recirculated through conduit 20, opening on a first end to conduit 18 and on a second end, opposing the first end, to an EGR valve 22, such as a conventional electromagnetic solenoid valve, linear solenoid valve, or sonic flow solenoid valve, to selectively meter recirculated exhaust gas provided to intake manifold 14. The degree of opening of EGR valve 22 is transduced by a conventional potentiometric position sensor 24 into signal EGRpos.

A powertrain control module PCM 28, such as a sixteen bit microcontroller, is provided including conventional controller elements, such as a central processing unit, read only memory, random access memory, input/output units, and other units generally known in the art to be used for vehicle control operations. The PCM 28 performs a series of procedures whereby input signals, such as EGRpos, Vsys, MAP, and RPM, are sampled through conventional operations, such as conventional analog to digital converter sampling operations, and a series of actuator commands, such as EGR, are generated in response thereto for carrying out engine control and diagnostic operations.

More specifically, PCM 28 issues a pulse width modulated (PWM) position control signal EGR to an EGR valve driver 26, such as a conventional current control circuit, for driving the EGR valve 22 at a desired duty cycle for precise control of the amount of recirculated exhaust gas delivered to intake manifold 14. The degree of opening of EGR valve 22 varies as the magnitude of the position control signal varies. As the duty cycle of the position control signal increases, the current sent to the magnetic coil (not shown) of EGR valve 22 increases. The increase in current applied to the magnetic coil of EGR valve 22 causes the magnetic force within the valve to increase, driving the EGR valve pintle (not shown) away from a rest position. As the EGR valve pintle moves away from the rest position, the degree of opening of EGR valve 22 increases, increasing, for given operating conditions, the flow rate of exhaust gas through conduit 20.

Figure 2:
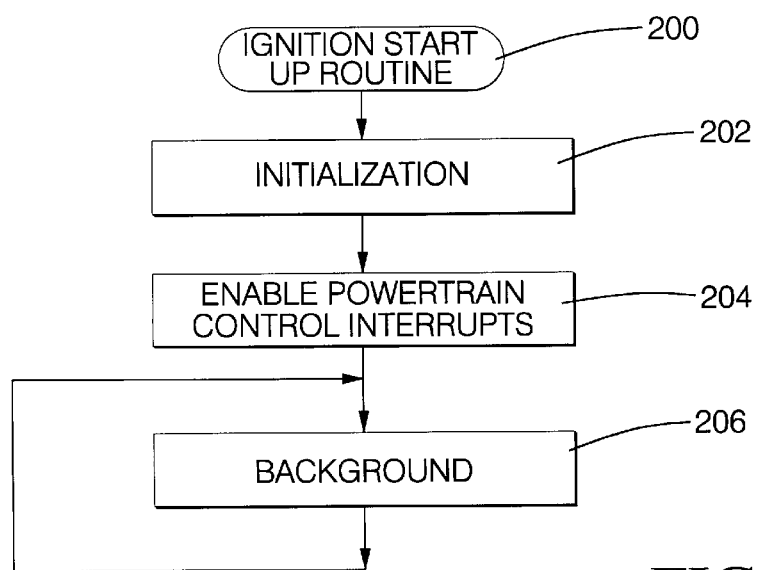
FIGS. 2–6 are computer flow diagrams illustrating the steps used to carry out the principles of this invention in accord with the preferred embodiment and the hardware of FIG. 1.

In accordance with this embodiment of the invention, the duty cycle of the EGR position control signal is determined by PCM 28 through a series of procedures. These procedures may be stored as a series of software routines periodically executed while the PCM 28 is operating. Included with such routines is a general PCM start-up routine illustrated in FIG. 2. The start-up routine is initiated at a step 200 following start-up of the PCM 28, such as when a vehicle ignition key is rotated to its "on" position. The start-up routine provides for general system initialization and the timing of execution of a plurality of control, diagnostic, and background subroutines.

More specifically, the start-up routine proceeds from step 200 to perform a general system initialization at a next step 202. Initialization may include transferring constants from the PCM 28's read only memory locations to random access memory locations, initializing counters, pointers, and flags used for conventional controller functions, and other general startup procedures. After the initialization at step 202 is complete, powertrain control interrupts are enabled at a next step 204. These interrupts may include time-based and event-based interrupts, as are generally understood in the art. Included in the interrupts of step 204 is a 12.5 millisecond EGR control time-based interrupt. After enabling powertrain control interrupts at step 204, the routine proceeds to background operations at a step 206. Background operations may include maintenance and diagnostic operations that are continuously repeated while the PCM 28 is operating. The background operations of step 206 are of a relatively low priority, such that upon occurrence of an interrupt as enabled at step 204, the background operation will temporarily cease, and the PCM 28 will transfer control to a service routine corresponding to the interrupt that occurred, such as the routine depicted in FIG. 3, to be described. Upon completion of the interrupt service routine, the background operations will resume at the point they were interrupted.

As stated, one of the interrupts enabled at step 204 is an EGR control time-based interrupt which occurs approximately every 12.5 milliseconds while the PCM 28 is activated. When an EGR control interrupt occurs, the microprocessor transfers control from the start-up routine of FIG. 2 to a step 300 of an EGR control routine illustrated in FIG. 3. The EGR control routine determines a desired EGR position control signal duty cycle, DC, through closed-loop control techniques by monitoring a plurality of signals, determining a base control signal duty cycle, and adjusting the base control signal duty cycle as a function of the monitored signals. The EGR control routine proceeds from step 300 to perform a general EGR system initialization at a next step 302. Initialization may include resetting the timers and variables needed for EGR control, accessing stored data values, and other initialization measures as are generally understood in the art. After initialization at step 302, a base duty cycle is learned at a next step 304 through the operations of FIG. 4, beginning at a step 400.

Figure 4:
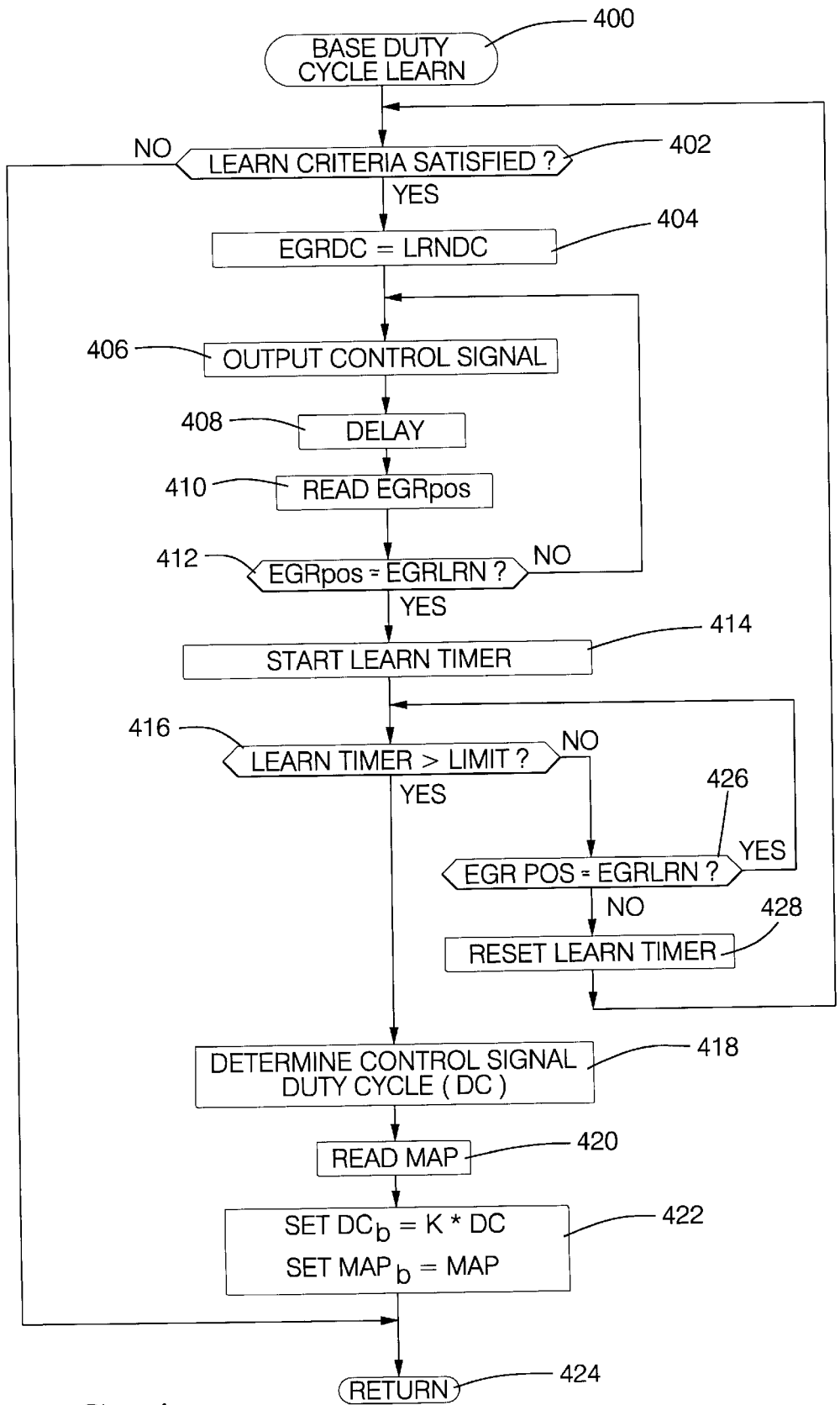

Referring to FIG. 4, the operations for learning of a base duty cycle, $DC_b$, are provided. The base duty cycle, $DC_b$, is the duty cycle to be continuously applied to EGR valve 22 to maintain the EGR coil (not shown) at an energized level just below the energization level corresponding to actuation of the EGR pintle (not shown), such that the EGR pintle is ready to begin lifting immediately when the EGR position control signal duty cycle is increased, requiring a smaller control gain to initiate pintle movement and providing for faster, more precise EGR control.

More specifically, the base duty cycle learn routine proceeds from step 400 to determine if certain duty cycle learn criteria are met at a next step 402. In this embodiment, engine speed, as indicated by engine speed signal RPM (FIG. 1) from a conventional engine speed transducer 30 (FIG. 1) must be below 1000 rpm for at least 2 seconds before a base duty cycle learn is permitted. It is desirable that the engine remain at a constant speed during a the base duty cycle learn to ensure the EGR base duty cycle learn routine has full control of EGR pintle movement, providing for a more accurate determination of the base duty cycle. If engine speed becomes greater than 1000 rpm at any time during execution of the base duty cycle learn routine, the base duty cycle learn routine is terminated and control is returned to a next step 306 of the EGR control routine of FIG. 3.

If the base duty cycle learn criteria are satisfied, as determined at step 402, the EGR position control signal duty cycle is set to a predetermined duty cycle, LRNDC, at a next step 404. The predetermined duty cycle, stored in a read only memory device (not shown) of PCM 28 (FIG. 1), corresponds to a predetermined degree of opening, EGRLRN, to be attained by EGR valve 22 before a base duty cycle learn will be executed. The predetermined degree of opening is such that the resulting flow of recirculated exhaust gas into intake manifold 14 is insignificant. In this embodiment the predetermined duty cycle corresponds to a one-tenth of a millimeter (0.10) degree of opening. The EGR position control signal, with its duty cycle set to the predetermined duty cycle, is output at a next step 406 to EGR valve driver 26 to drive EGR valve 22 to the predetermined degree of opening, as described previously.

A delay to provide time for EGR valve position stabilization in response to the change in the EGR position control signal duty cycle is implemented at a next step 408. Following the delay, a signal representing actual EGR degree of opening, EGRpos (FIG. 1), output by EGR position sensor 24 (FIG. 1), is sampled at a step 410 and compared to the predetermined degree of opening at a next step 412. If the actual EGR degree of opening does not substantially equal the predetermined degree of opening, the routine returns to step 402 and steps 402–410 are repeated until the actual EGR degree of opening substantially equals the predetermined degree of opening or until the base duty cycle learn routine is terminated.

If the actual EGR degree of opening is substantially equal to the predetermined degree of opening, as determined at step 412, a learn timer is started at a next step 414. The learn timer records the amount of time the EGR valve has been at the predetermined degree of opening. Because EGR movement may be unstable during certain operating conditions, it is desirable to ensure that the EGR degree of opening has remained constant for a period of time before recording data. The time limit in this embodiment is set at two seconds.

After starting the learn timer at step 414, the routine proceeds to a next step 416 where the learn timer is compared to a predetermined time limit. If the learn timer is not greater than the predetermined time limit, another EGR degree of opening check, as previously described for step 412, is executed at a step 426 to ensure there has been substantially no variation in the EGR valve degree of opening and that the actual EGR valve degree of opening is still substantially equal to the predetermined degree of opening. If the actual degree of opening is not substantially equal to the predetermined degree of opening, as determined at step 426, the learn timer is reset at a next step 428, and steps 402–416 are repeated until the actual EGR valve degree of opening is substantially equal to the predetermined degree of opening for the predetermined time limit, or until the EGR base duty cycle learn routine is terminated.

Returning to step 426, if the actual EGR valve degree of opening is substantially equal to the predetermined degree of opening, steps 416 and 424 are repeated until the learn timer is greater than the predetermined time limit, indicating the EGR valve has remained at the predetermined degree of opening for the requisite amount of time.

Returning to 416, if the learn timer is greater than the predetermined time limit, the current value of the EGR duty cycle is recorded at a next step 418 and the current value of the manifold air pressure, as indicated by signal MAP (FIG. 1), is recorded at a next step 420. Next, the base duty cycle, $DC_b$, is set equal to the duty cycle recorded at step 418 multiplied by a predetermined factor, at a step 422, such that the base duty cycle, when applied to EGR valve 22, will maintain the EGR valve's magnetic coil (not shown) at an energized level such that the EGR pintle (not shown) is maintained in a position just below the beginning of valve opening. In this embodiment, the predetermined factor is 0.9. Also at step 422, a base manifold air pressure, $MAP_b$, is set to the manifold air pressure recorded at step 420. Control is then returned to a step 306 of FIG. 3 via a next step 424.

Figure 3:
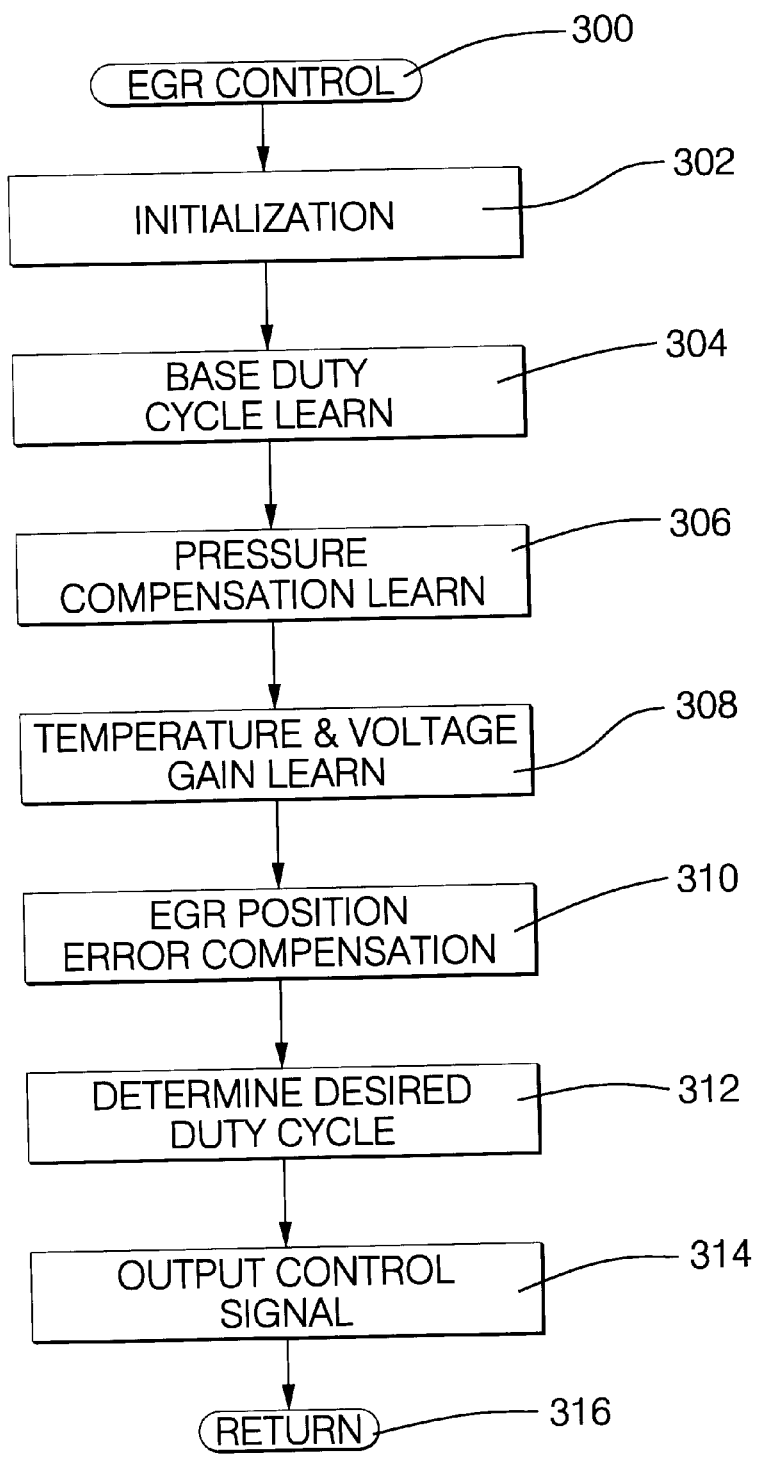
Figure 5:
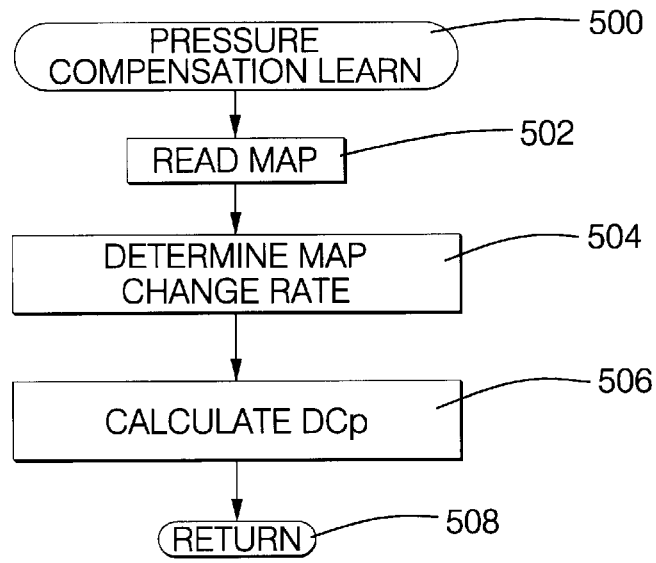

At step 306 of FIG. 3, a pressure compensation learn routine, illustrated by the flow of operations of FIG. 5, is executed to determine a duty cycle compensation factor, $DC_p$, to compensate the EGR position signal duty cycle for fluctuations in EGR operating system pressure. Fluctuations in pressure difference felt by the EGR valve pintle (not shown) due to changes in manifold pressure in response to changes in vehicle operating conditions, such as throttle position changes, can cause EGR valve pintle lift disturbance too large and rapid for the feedback controller to effectively suppress. Also, for a given pressure difference across the EGR valve, between conduit 20 (FIG. 1) and intake manifold 14 (FIG. 1), the fraction of the pressure difference actually felt by the EGR valve pintle decays as the pintle lift (degree of opening of the EGR valve) increases, making stable transient response difficult to achieve. To compensate the EGR position control signal duty cycle for these pressure differences, a pressure compensation factor, $DC_p$, is applied to the closed-loop feedback control signal, to be described.

More specifically, the pressure compensation learn routine begins at a step 500 of FIG. 5 and proceeds to determine a manifold air pressure value at a next step 502 by reading the MAP signal of FIG. 1. A rate of change in manifold air pressure is calculated at a next step 504 by differentiating a series of previously stored manifold air pressure values over a period of time. The pressure compensation factor, $DC_p$, is then calculated at a step 506 using the formula:

$$DC_p = [K_1(MAP - MAP_b) + K_3(dMAP/dt)]K_2$$

where MAP is the value of the manifold air pressure read at step 502, $MAP_b$ is the base manifold air pressure determined at step 422 of FIG. 4, dMAP/dt is the rate of change of manifold air pressure determined at step 504, and $K_1$, $K_2$, and $K_3$ are constants that depend on pintle size and the force versus current characteristics of the solenoid. These constants may be either tabulated or calibrated through conventional procedures as are generally understood in the art. After the pressure compensation factor has been calculated at step 506, control is returned to step 308 of FIG. 3 via a next step 508.

Figure 6:
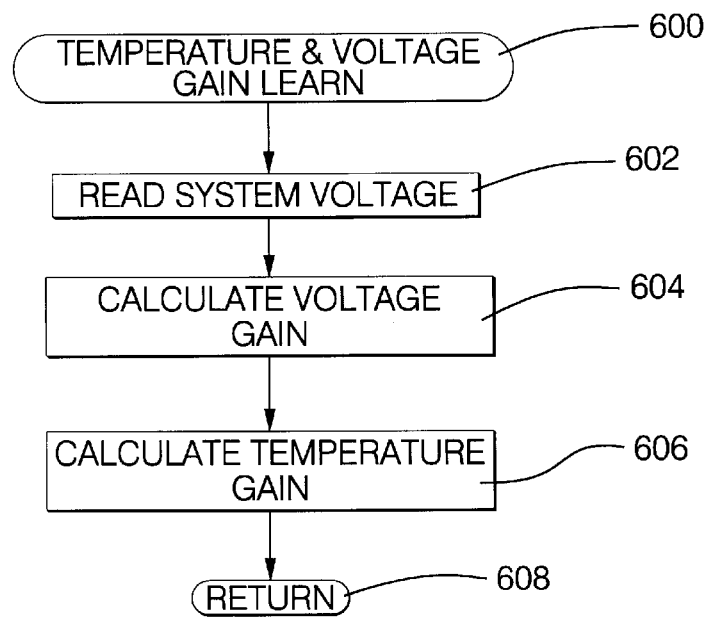

A temperature and voltage gain learn routine, illustrated in FIG. 6, beginning at a step 600, is executed at step 308 of FIG. 3 to determine closed-loop controller gains, $K_t$ and $K_v$, to be applied to the EGR position control signal to compensate for fluctuations in EGR valve operating voltage and temperature. The electrical resistance of the EGR valve magnetic coil (not shown) increases as the operating temperature of the EGR valve increases. As the electrical resistance of the magnetic coil increases, the current applied to the magnetic coil and the resulting magnetic force within the magnetic coil decreases for a given EGR position control signal duty cycle. Accordingly, controller gains that are optimum for a relatively cool EGR valve yield slower responses at higher EGR valve temperatures, and the wide range of temperatures the EGR valve is exposed to throughout an ignition cycle can cause EGR control difficulties. Similarly, the voltage level delivered by EGR valve driver 26 can vary from vehicle to vehicle, and with vehicle operating conditions, such as engine speed and vehicle battery charge. As the voltage delivered by EGR valve driver 26 varies, the magnetic force of the EGR valve magnetic coil varies for a given EGR position control signal duty cycle, affecting EGR control system performance.

To compensate for fluctuations in EGR operating system temperature and voltage, controller gains $K_t$ and $K_v$ are used to adjust the EGR position control signal duty cycle. The temperature and voltage gain learn routine of FIG. 6 determines the temperature compensation gain, $K_t$, by using the base duty cycle, $DC_b$, learned at step 304 of FIG. 3, as an indirect measure of EGR valve temperature. As coil temperature increases, a larger $DC_b$ will be measured for a given base manifold air pressure $MAP_b$. To compensate for fluctuations in EGR operating system voltage, voltage compensation gain, $K_v$, is determined by using an operating system voltage measurement conventionally available to PCM 28.

Referring to FIG. 6, the routine begins at a step 600 and proceeds to read a system voltage, Vsys, at a next step 602. The system voltage may be supplied by a dedicated sensor (not shown) that outputs a signal representing system voltage, it may be sensed internally by the PCM 28, as in this embodiment, or it may be provided by any other suitable conventional sensing hardware. After a system voltage, Vsys, is determined at step 602, a voltage gain factor, $K_v$, is calculated at a next step 604 by the formula:

$$K_v = Vcal/Vsys$$

where Vcal is a calibrated nominal voltage usually representative of vehicle battery voltage, such as 13.5 volts.

If a system voltage measurement is not available, the base duty cycle, $DC_b$, learned at step 304 of FIG. 3 can be used to compute the voltage compensation gain, $K_v$, using the formula:

$$K_v = [Vcal*K]/k$$

where k is the specified or measured slope of the force versus current curve for EGR valve 22, Vcal is a calibrated nominal voltage as described previously, and K is calculated as follows:

$$K = [(W + F_o + A_p*P_{atm}) - A_p*MAP_b]/DC_b$$

where W is the specified or measured weight of the pintle of EGR valve 22, $F_o$ is the specified or measured spring preload force of EGR valve 22, $A_p$ is the specified or measured surface area of the pintle face of EGR valve 22, $P_{atm}$ is atmospheric pressure, $MAP_b$ is the base manifold air pressure determined at step 422 of FIG. 4, and $DC_b$ is the base duty cycle determined at step 422 of FIG. 4. In this embodiment, the atmospheric pressure, $P_{atm}$, is the value of the manifold air pressure, as indicated by signal MAP (FIG. 1) prior to engine start. W, $F_o$, and $A_p$ may be specified by the manufacturer of EGR valve 22 or measured directly from a representative valve.

After the voltage compensation gain is calculated at step 604, the temperature compensation gain, $K_t$, is calculated at a next step 606. The temperature compensation gain, $K_t$, is calculated by the formula:

$$K_t = Kcal/(K*K_v)$$

where Kcal is a nominal value of $K_t$, $K_v$ is the voltage compensation gain determined at step 604, and K is calculated as described previously. In this embodiment Kcal corresponds to the specified maximum magnetic force achieved by the magnetic coil (not shown) of EGR valve 22 when an EGR position control signal with a 100% duty cycle is applied. Once the temperature gain is calculated at step 606, the routine returns control, via step 608, to a step 310 of FIG. 3.

An EGR position error compensation operation is next executed to determine an error compensation value to compensate for position errors resulting from normal operation of the EGR closed-loop control system, as is generally understood in the art, at step 310 of FIG. 3. The error compensation value, $DC_e$, is generated through application of a conventional control technique, such as through the application of a proportional-integral-derivative (PID) control technique, to a position error E, as follows:

$$DC_e = (K_i*\int E dt) + (K_p*E) + (K_d E/dt)$$

where E is the position error determined as a difference between the actual EGR degree of opening and a desired EGR degree of opening, and $K_i$, $K_p$, $K_d$ are calibrated variable controller gains. The position error compensation value may also be calculated using a model-based Kalman filtering algorithm or any other suitable closed loop control technique generally known in the art.

After the position error compensation value is determined at step 310, a desired EGR valve position control signal duty cycle, DC, is calculated at a next step 312, as follows:

$$DC = DC_b + (DC_e + D_p)K_t K_v$$

in which $DC_b$ is the base duty cycle determined at step 422 of FIG. 4, $DC_e$ is the error compensation duty cycle determined at step 310 of FIG. 3, $DC_p$ is the pressure compensation duty cycle determined at step 506 of FIG. 5, $K_t$ is the temperature compensation gain determined at step 606 of FIG. 6, and $K_v$ is the voltage compensation gain determined at step 604 of FIG. 6. Once the desired duty cycle is calculated at step 312, at a next step 314 the desired duty cycle is output to EGR valve driver 26 of FIG. 1, forcing EGR valve 22 to the desired degree of opening as described previously. The routine then returns control, via a next step 316, to the background operations of step 206 of FIG. 2.

The base duty cycle learn of step 304 of FIG. 3 can be programmed to execute every EGR control loop, providing periodic updating of the base duty cycle to maintain an accurate $DC_b$ value in accordance with an important aspect of this invention. In an alternative embodiment, the base duty cycle learn can be executed only once during an ignition cycle, or in still a further embodiment, the base duty cycle learn can be executed whenever the desired degree of opening of the EGR is zero and the engine operating conditions are stable, such as at vehicle idle. The inventors further intend that the combination of subroutines initiated through steps 304–310 may be altered by eliminating a subroutine or reordering the subroutines, without affecting the scope of the invention.

The preferred embodiment for the purpose of explaining this invention is not to be taken as limiting or restricting the invention since many modifications may be made through the exercise of ordinary skill in the art without departing from the scope of the invention.

The embodiments of the invention in which a privilege or property is claimed are described as follows:

I claim:

1. A method for controlling a degree of opening of an exhaust gas recirculation (EGR) valve responsive to a valve control signal, comprising the steps of:

identifying a minimum valve control signal required to open the valve from a rest position;

establishing a base valve control signal as a function of the identified minimum valve control signal; and applying the base control signal to the valve to maintain the valve in an energized state at the rest position.

2. The method of claim 1, wherein the rest position corresponds to a fully closed EGR valve position.

3. The method of claim 1, wherein the step of identifying the minimum valve control signal further comprises the steps of:

establishing a desired EGR valve degree of opening;

applying a valve control signal corresponding to the desired degree of opening to the EGR valve, to drive the EGR valve away from the rest position to the desired degree of opening;

monitoring a signal indicating an actual degree of opening of the EGR valve;

comparing the actual degree of opening to the desired degree of opening;

when the actual EGR degree of opening does not substantially equal the desired degree of opening, adjusting the applied valve control signal as a function of the difference between the actual degree of opening and the desired degree of opening; and when the actual EGR degree of opening substantially equals the desired degree of opening for a predetermined test period, recording the valve control signal as the minimum valve control signal.

4. The method of claim 1, wherein an adjustment value is added to the base control signal to drive the EGR valve away from the rest position to a desired degree of opening, further comprising the steps of:

establishing a desired degree of EGR opening;

monitoring a signal indicating an actual degree of opening of the EGR valve;

comparing the actual degree of opening to the desired degree of opening;

when the actual degree of opening does not substantially equal the desired degree of opening, establishing an adjustment value as a function of the difference between the actual degree of opening and the desired degree of opening;

adding the adjustment value to the base valve control signal to form a command signal; and wherein the applying step applies the command signal to the EGR valve to drive the EGR valve away from the rest position to the desired degree of opening.

5. The method of claim 4, wherein the adjustment value is compensated for fluctuations in a predetermined engine operating parameter, further comprising the steps of:

establishing a value of a predetermined engine operating parameter;

modifying the adjustment value as a function of the established value; and wherein the adding step, adds the modified adjustment value to the base valve control signal.

6. The method of claim 5, wherein the predetermined engine operating parameter is operating system voltage.

7. The method of claim 5, wherein the predetermined engine operating parameter is operating system temperature.

8. The method of claim 1, wherein the base valve control signal is adjusted to compensate for fluctuations in system pressure, further comprising the steps of:

establishing a base manifold air pressure;

monitoring a signal indicating actual manifold air pressure;

establishing a pressure compensation value as a function of the base manifold air pressure and the actual manifold air pressure;

applying the pressure compensation value to the base valve control signal to adjust the base valve control signal; and wherein the applying step applies the adjusted base valve control signal to maintain the EGR valve in an energized state at the rest position.

9. The method of claim 8, wherein the pressure compensation value is adjusted to compensate for fluctuations in a predetermined engine operating parameter, further comprising the steps of:

establishing a value of a predetermined engine operating parameter;

adjusting the pressure compensation value as a function of the established engine operating parameter value; and wherein the step of adjusting the base valve control signal adjusts the base valve control signal as a function of the adjusted error compensation value.

10. The method of claim 10, wherein the predetermined engine operating parameter is operating system voltage.

11. The method of claim 10, wherein the predetermined engine operating parameter is operating system temperature.

12. A method for controlling a degree of opening of an exhaust gas recirculation (EGR) valve responsive to a valve control signal, comprising the steps of:

identifying a minimum valve control signal required to open the EGR valve from a base position to a predetermined desired degree of opening;

establishing an initial valve control signal by reducing the identified minimum valve control signal by a predetermined value;

determining a desired degree of opening of the EGR valve;

when the desired degree of opening of the EGR valve substantially equals the base position, applying the initial valve control signal to the valve to maintain the valve in an energized state in the base position; and when the desired degree of opening of the EGR valve does not substantially equal the base position, calculating a desired valve control signal as a function of the initial valve control signal and the desired degree of opening, and applying the calculated desired valve control signal to the valve to drive the valve to the desired degree of opening.

13. The method of claim 12, wherein the step of identifying the minimum valve control signal further comprises the steps of:

establishing a desired EGR valve degree of opening;

applying a valve control signal corresponding to the desired degree of opening to the EGR valve, to drive the EGR valve away from the fully closed position to the desired degree of opening;

monitoring a signal indicating an actual degree of opening of the EGR valve;

comparing the actual degree of opening to the desired degree of opening;

when the actual EGR degree of opening does not substantially equal the desired degree of opening, adjusting the applied valve control signal as a function of the difference between the actual degree of opening and the desired degree of opening; and when the actual EGR degree of opening substantially equals the desired degree of opening for a predetermined test period, recording the adjusted valve control signal as the minimum valve control signal.

14. The method of claim 12, wherein the initial valve control signal is adjusted to compensate for fluctuations in system pressure, further comprising the steps of:

establishing a base manifold air pressure;

monitoring a signal indicating actual manifold air pressure;

establishing a pressure compensation value as a function of the base manifold air pressure and the actual manifold air pressure;

applying the pressure compensation value to the initial valve control signal to adjust the initial valve control signal; and wherein the applying step applies the adjusted initial valve control signal to maintain the EGR valve in an energized state at the base position.

15. The method of claim 14, wherein the pressure compensation value is adjusted to compensate for fluctuations in a predetermined engine operating parameter, further comprising the steps of:

establishing a value of a predetermined engine operating parameter;

adjusting the established pressure compensation value as a function of the established value; and wherein the applying step applies the adjusted pressure compensation value to maintain the EGR valve in an energized state at the base position.

* * * * *